United States Patent
Shimizu

(10) Patent No.: US 7,724,128 B2
(45) Date of Patent: May 25, 2010

(54) ON-VEHICLE EMERGENCY CALL SYSTEM

(75) Inventor: Takashi Shimizu, Gamagori (JP)

(73) Assignee: Denso Corporation, Kariya (JP)

( * ) Notice: Subject to any disclaimer, the term of this patent is extended or adjusted under 35 U.S.C. 154(b) by 235 days.

(21) Appl. No.: 11/983,624

(22) Filed: Nov. 12, 2007

(65) Prior Publication Data
US 2008/0122592 A1 May 29, 2008

(30) Foreign Application Priority Data
Nov. 24, 2006 (JP) ............... 2006-317070

(51) Int. Cl.
B60Q 1/00 (2006.01)
(52) U.S. Cl. ............... 340/436; 340/435; 340/425.5; 340/539.13; 340/901; 455/404.1; 455/404.2; 455/344; 455/345; 455/569.1; 455/569.2
(58) Field of Classification Search ......... 340/436, 340/435, 425.5, 539.13, 636.1, 901; 455/404.1, 455/404.2, 344, 345, 569.1, 569.2
See application file for complete search history.

(56) References Cited

U.S. PATENT DOCUMENTS

| | | | | |
|---|---|---|---|---|
| 5,726,636 | A * | 3/1998 | Hayes, Jr. ............... | 340/636.1 |
| 6,377,169 | B1 * | 4/2002 | Yanagisawa ............. | 340/504 |
| 6,934,365 | B2 * | 8/2005 | Suganuma et al. ....... | 379/45 |
| 7,274,924 | B2 * | 9/2007 | Yoshioka ................ | 455/404.1 |
| 2004/0072345 | A1 * | 4/2004 | Altaba et al. ............. | 435/368 |
| 2004/0142678 | A1 * | 7/2004 | Krasner .................. | 455/404.2 |

FOREIGN PATENT DOCUMENTS

| | | |
|---|---|---|
| JP | 09-130284 | 5/1997 |
| JP | 2001-166017 | 6/2001 |
| JP | 2002-288767 | 10/2002 |
| JP | 2004-362159 | 12/2004 |

OTHER PUBLICATIONS

Office action dated Jun. 26, 2009 in corresponding Chinese Application No. 2007 10193661.0.

* cited by examiner

Primary Examiner—Tai T Nguyen
(74) Attorney, Agent, or Firm—Harness, Dickey & Pierce, PLC

(57) ABSTRACT

An on-vehicle emergency call system is powered by a main battery. The emergency call system includes a communication unit that communicates with a service center, a control unit that drives the communication unit with electric power supplied from the main battery to connect a communication line with the service center when an emergency call triggering signal is given thereto. The control unit makes the communication unit send a battery-low-voltage signal if terminal voltage of the main battery becomes lower than a threshold voltage while the communication line is connected with the service center.

5 Claims, 2 Drawing Sheets

ON-VEHICLE EMERGENCY CALL SYSTEM

CROSS REFERENCE TO RELATED APPLICATION

The present application is based on and claims priority from Japanese Patent Application 2006-317070, filed Nov. 24, 2006, the contents of which are incorporated herein by reference.

BACKGROUND OF THE INVENTION

1. Field of the Invention

The present invention relates to an emergency call system that includes a communication unit for connecting a communication line with a service center and a control unit for driving the communication device by supplying electric power from a battery when an emergency call starts.

2. Description of the Related Art

JP-2002-288767-A discloses an on-vehicle emergency call system that sends an emergency signal to a service center when an air bag is inflated. The disclosed on-vehicle emergency call system periodically self-diagnoses and gives an alarm if a failure is detected so that negligence of failure can be prevented.

Because self-diagnosis is carried out immediately when the on-vehicle emergency call system is started, it may become impossible to immediately give the service center a call if battery voltage is lower than a lower limit voltage. Accordingly, the service center may not receive the call, so that the vehicle cannot receive an appropriate help from the service center.

SUMMARY OF THE INVENTION

Therefore, an object of the invention is to provide an on-vehicle emergency call system that can give a call to a service center without fail even if the battery voltage becomes lower than a lower limit voltage.

According to a feature of the invention, an on-vehicle emergency call system that is powered by a main battery includes a communication unit to communicate the emergency call system with a service center, a control unit that drives the communication unit with electric power supplied from the main battery to connect a communication line with the service center when an emergency call triggering signal is given thereto, wherein the control unit makes the communication unit send a battery-low-voltage signal if terminal voltage of the main battery becomes lower than a first threshold voltage while the communication line is connected with the service center.

Therefore, the service center can predict time when the voice or data communication with the emergency call system of a vehicle stops. Therefore, the service center 13 can take an appropriate measure to assist a driver or user of the vehicle.

In the above emergency call system, the control unit may be connected to an airbag system so that the emergency call triggering signal may be given when the air bag system provides an airbag inflation signal and the emergency call switch is also operated.

The emergency call triggering signal may be given when the emergency call switch is operated. However, the control unit does not make the communication unit send a battery-low-voltage signal even if terminal voltage of the main battery becomes lower than a first threshold voltage.

The communication line may be a voice communication line and the control unit makes the communication unit send the service center a battery-low-voltage signal via the voice communication line if the terminal voltage of the main battery becomes lower than the threshold voltage after switching from voice communication to data communication.

The control unit may replace the main battery with an auxiliary battery if the terminal voltage of the main battery becomes lower than a second threshold voltage.

The control unit may make the communication unit send the service center a battery-low-voltage signal if the terminal voltage of the auxiliary battery becomes lower than a third threshold voltage.

The control unit may make the communication unit send the service center information on remaining power capacity of the auxiliary battery.

According to another feature of the invention, an on-vehicle emergency call system includes a main battery, an auxiliary battery, a communication unit for communicating with a service center, a power source control means for examining the terminal voltage of the main battery and a control unit for driving the communication unit to connect a communication line with the service center when an emergency call triggering signal is given thereto. The control unit makes the communication unit send a battery-low-voltage signal and replace the main battery with the auxiliary battery if the power source control means judges that the terminal voltage of the main battery becomes lower than a threshold voltage while the communication line is connected with the service center.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

Figure 1:
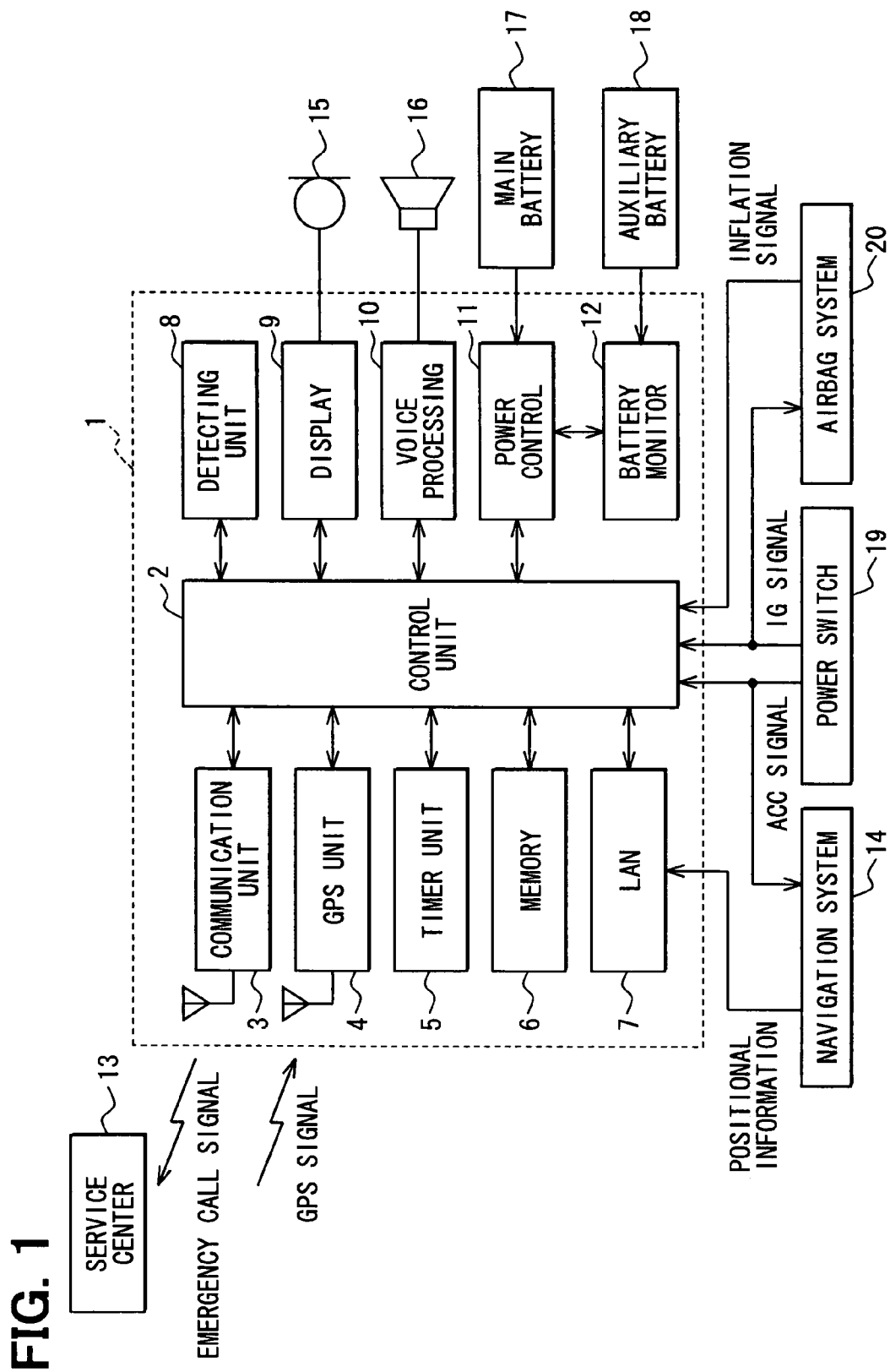
FIG. 1 is a block diagram of an on-vehicle emergency call system according to the invention.
Figure 2:
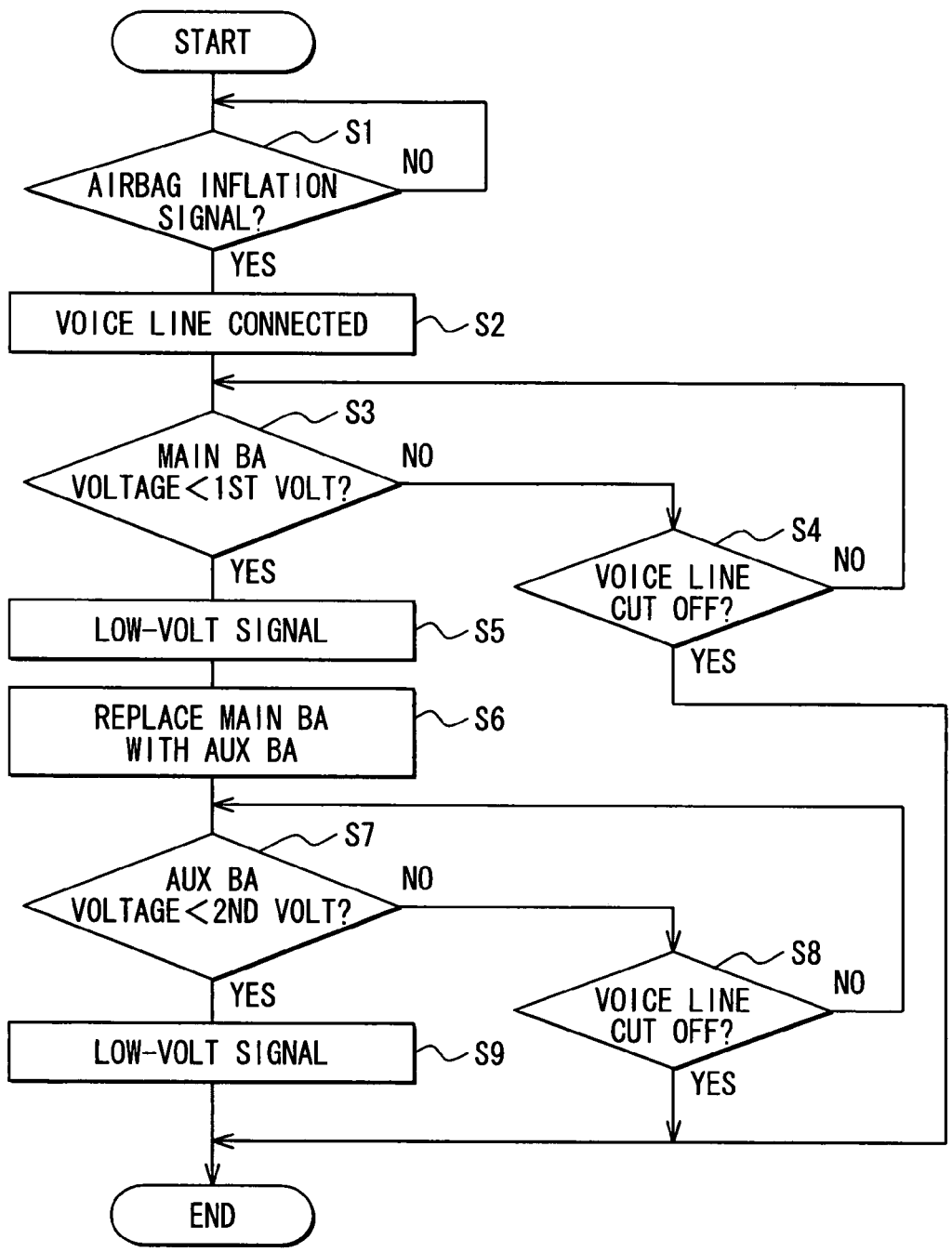
FIG. 2 is a flow chart showing an operation of the emergency call system.

An on-vehicle emergency control system 1 according to a preferred embodiment of the invention will be described with reference to FIGS. 1 and 2.

The on-vehicle emergency call system 1 includes a control unit 2, a wireless communication unit 3, a GPS unit, a timer unit 5, a memory 6, a LAN unit 7, an operation detecting unit 8, a display unit 9, a voice signal processing unit 10, an electric power source control unit 11 and an auxiliary battery monitor unit 12, etc.

The control unit 2 is mainly constructed of a CPU to control the total operation of the on-vehicle emergency call system 1. The wireless communication unit 3 connects a voice communication line with a service center 13 to send the service center 13 an emergency call signal if the control unit 2 provides a command signal of the emergency call. Then, the wireless communication unit 3 switches from the voice communication to data communication over while keeps connecting the voice communication line so that a driver in a vehicle and an operator at the service center can not only talk but also exchange data with each other. Incidentally, the emergency call signal includes data of the position of the vehicle, data for identifying the on-vehicle emergency call system 1, etc.

The GPS unit 4 extracts parameters from a GPS signal to get positional information when it receives the GPS signal from a GPS constellation. The timer unit 5 has a clock that provides the control unit with date-hour data if it receives a date-hour read signal from the control unit 2. The memory 6 stores various data. The LAN unit 7 receives positional information from a navigation system 14. The operation detecting unit 8 provides the control unit 2 with an operation detecting signal if it detects operation of an emergency call button by a user. The display unit 9 displays related display-information if it receives a display command signal from the control unit 2.

The voice signal processing unit 10 processes voice signals that are inputted by a microphone 15 or outputted by a speaker 16. In the meanwhile, the user can communicate with the operator at the service center 3 so that the user can directly ask the service center for help or directly report the service center about an accident.

The electric power source control unit 11 supplies electric power to various circuits and components of the vehicle from a main battery 17 or from an auxiliary battery 18, which is a primary battery. In more detail, the electric power source control unit 11 monitors the terminal voltages of the main battery 17 and the auxiliary battery 18 so as to supply electric power to the various circuits and components from the auxiliary battery 18 via the auxiliary battery monitor unit 12 only when the terminal voltage of the main battery 17 is lower than a first threshold voltage (e.g. 8 volts).

When the auxiliary battery monitor unit 12 receives a command signal of operation check via the electric power source control unit 11, it examines the terminal voltage of the auxiliary battery 18 and reports the result of the examination to the control unit 2 via the electric power source control unit 11.

A power switch 19 includes an ignition (IG) switch and an accessory (ACC) switch. The power switch 19 provides the control unit 2 and an airbag system 20 with an IG signal that indicates turn-on or turn-off of the IG switch. The power switch 19 also provides the control unit 2 and a navigation system 14 with an ACC signal that indicates turn-on or turn-off of the ACC switch. The control unit 2 and the navigation system 14 respectively start or stop in response to the ACC signal. When the IG signal indicates turn-on of the IG switch, the airbag system 20 sends the control unit 2 an airbag inflation signal if an airbag is inflated.

In this embodiment, the on-vehicle emergency call system 1 may be formed in a module. The control unit 2 starts the emergency call operation either when the operation detecting unit 8 detects a user operating the emergency call button or when the airbag system 20 reports that the airbag is inflated. The control unit 2 sends the service center 13 an emergency call signal that includes positional information measured by the GPS unit 4 and/or positional information obtained by the navigation system via the wireless communication unit 3.

The operation of the on-vehicle emergency call system will be described with reference to a flow diagram shown in FIG. 2.

When the control unit 2 receives an airbag inflation signal from the airbag system 20 at step S1, YES is provided to make the wireless communication unit 3 connect the voice communication line with the service center 13 at S2.

Then, the electric power source control unit 11 examines whether the terminal voltage of the main battery 17 is lower than the first threshold voltage or not at S3 and, thereafter, whether the voice communication line is cut off or not at S4, if the result of step S3 is NO. If, on the other hand, the result of step S3 is YES, the control unit 2 sends the service center 13 a main-battery-low-voltage signal via the wireless communication unit 3 at S5 before the voice communication line is cut off.

Subsequently, the control unit 2 switches the connection with the emergency call system 1 from the main battery 17 to the auxiliary battery 18 at S6 and, thereafter, examines whether the terminal voltage of the auxiliary battery 18 is lower than a second threshold voltage (e.g. 6 volt) at S7.

If the result of S7 is NO, whether the voice communication line is cut off or not is examined at S8 and ends its operation if the result of S8 is YES. If the result of step S7 is YES, the control unit 2 sends the service center 13 an auxiliary-battery-low-voltage signal via the wireless communication unit 3 at S 9 before the voice communication line is cut off and ends its operation.

The control unit 2 carries out the above process only when it receives the airbag inflation signal from the airbag system 20. In other words, the control unit 2 does not carry out the above process even if the operation detecting unit 8 provides the control unit 2 with the operation detecting signal.

The control unit 2 may make the wireless communication unit 3 send the service center 13 information on remaining power capacity or operable time of the auxiliary battery 18 after switching the electric power supply source from the main battery 17 to the auxiliary battery 18. The control unit 2 may make the wireless communication unit 3 send the service center 13 the main-battery-low-voltage signal or the auxiliary-battery-low-voltage signal if the terminal voltage of the main battery 17 or the auxiliary battery 18 becomes lower than the first or second threshold voltage while the voice communication is carrying out after switching from the voice communication to the data communication via the voice communication line. The control unit 2 may also make the wireless communication unit 3 to report to the service center 13 when the main battery 17 is replaced with the auxiliary battery 18.

Thus, the service center 13 can predict time of breakdown of the voice or data communication with the emergency call system of a vehicle. Therefore, the service center 13 can take an appropriate measure to assist the driver or user of the vehicle.

Further, the control unit 2 may reduce the size of the data to be sent to the service center 13 after the main-battery-low-voltage signal or the auxiliary-battery-low-voltage signal is sent thereto. The data to be sent may be selected from data of higher priority.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. An on-vehicle emergency call system powered by a main battery comprising:
   a communication unit that communicates with a service center,
   a control unit that drives the communication unit with electric power supplied from the main battery to connect a communication line with the service center when an emergency call triggering signal is given thereto, and
   an auxiliary battery, wherein
   while the communication line is connected to the service center, the control unit makes the communication unit send a main battery-low-voltage signal if terminal voltage of the main battery becomes lower than a first threshold, replaces the main battery with the auxiliary battery if the terminal voltage of the main battery becomes lower than a second threshold voltage; and makes the communication unit send the service center an auxiliary battery-low-voltage signal if terminal voltage of the auxiliary battery becomes lower than a third threshold voltage.

2. An on-vehicle emergency call system as in claim 1 further comprising an emergency call switch, wherein:
   the control unit is connected to an airbag system; and
   the emergency call triggering signal is given when the air bag system provides an airbag inflation signal and the emergency call switch is operated.

3. An on-vehicle emergency call system as in claim 2, wherein:
   the emergency call triggering signal is also given when the emergency call switch is operated; and
   the control unit does not make the communication unit send the main battery-low-voltage signal even if terminal voltage of the main battery becomes lower than a first threshold voltage.

4. An on-vehicle emergency call system as in claim 1, wherein:
   the communication line includes a voice communication line and a data communication line;
   the voice communication line is normally connected by the communication unit with the service center;
   the control unit makes the communication unit send the service center the main battery-low-voltage signal via the data communication line if the terminal voltage of the main battery becomes lower than the first threshold voltage.

5. An on-vehicle emergency call system as in claim 1, wherein the control unit makes the communication unit send the service center information on remaining power capacity of the auxiliary battery.

* * * * *